US012498955B2

United States Patent
Krivenok et al.

(12) United States Patent
(10) Patent No.: US 12,498,955 B2
(45) Date of Patent: Dec. 16, 2025

(54) VIRTUAL STORAGE APPLIANCE WITH VIRTUAL DISK INSTANCES FOR BACKEND NON-VOLATILE DATA STORAGE

(71) Applicant: Dell Products L.P., Round Rock, TX (US)

(72) Inventors: Dmitry Vladimirovich Krivenok, Dublin (IE); Amitai Alkalay, Kadima (IL)

(73) Assignee: Dell Products L.P., Round Rock, TX (US)

( * ) Notice: Subject to any disclaimer, the term of this patent is extended or adjusted under 35 U.S.C. 154(b) by 431 days.

(21) Appl. No.: 18/201,856

(22) Filed: May 25, 2023

(65) Prior Publication Data

US 2024/0394086 A1   Nov. 28, 2024

(51) Int. Cl.
G06F 9/455 (2018.01)

(52) U.S. Cl.
CPC ............. *G06F 9/45558* (2013.01); *G06F 2009/45562* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| 10,108,560 | B1 | 10/2018 | Lamb et al. | |
|---|---|---|---|---|
| 11,340,837 | B1 | 5/2022 | Vohra et al. | |
| 2020/0019343 | A1* | 1/2020 | Bronnikov | G06F 3/0664 |
| 2020/0159421 | A1 | 5/2020 | Karumbunathan et al. | |
| 2024/0126481 | A1* | 4/2024 | Krivenok | G06F 3/0673 |

FOREIGN PATENT DOCUMENTS

WO   WO-2016160041 A2 * 10/2016 ............. G06F 3/067

* cited by examiner

*Primary Examiner* — Lance Leonard Barry
(74) *Attorney, Agent, or Firm* — BainwoodHuang

(57) ABSTRACT

Multiple virtual disk instances are created, each of which is a virtual machine. Each one of the virtual disk instances aggregates non-volatile data storage of cloud storage volumes that are directly attached to it into a single logical volume. A sub-network is created that connects the virtual disk instances to a network interface of each one of storage controllers of a virtual storage appliance. The storage controllers consume the logical volumes of non-volatile data storage corresponding to the virtual disk instances over the subnetwork, in order to persistently store received user data thereon. The cloud storage volumes are each capable of being attached to only a single virtual machine, and are attached to the virtual disk instances through data storage interfaces of the virtual disk instances.

20 Claims, 4 Drawing Sheets

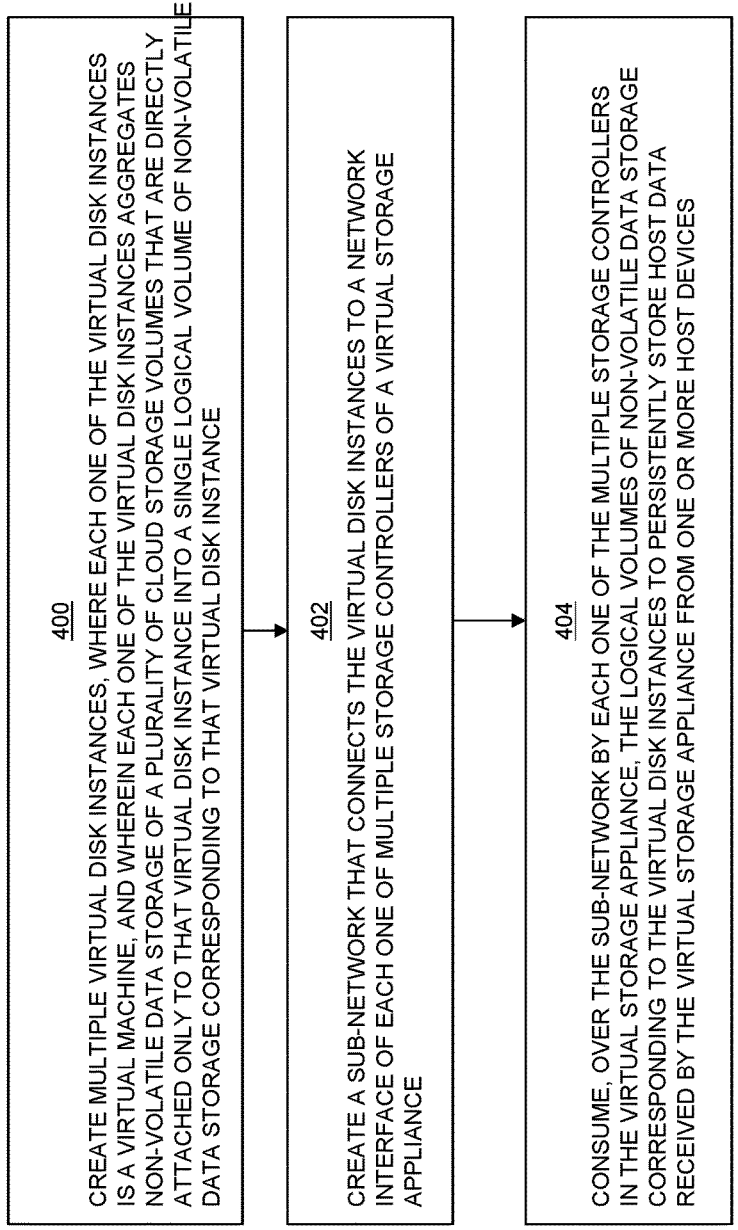

VIRTUAL STORAGE APPLIANCE WITH VIRTUAL DISK INSTANCES FOR BACKEND NON-VOLATILE DATA STORAGE

TECHNICAL FIELD

The present disclosure relates generally to data storage systems, and more specifically to technology for providing backend non-volatile data storage to a virtual storage appliance.

BACKGROUND

A Virtual Storage Appliance (VSA) is a software appliance including storage controllers (also referred to as "nodes") that are virtual machines (also referred to as "instances") provided by a cloud computing platform. During operation, the VSA processes host I/O requests received by the VSA from virtual or physical host machines (also referred to as "hosts"). The host I/O requests received and processed by the VSA specify user data that is written and/or read by the hosts. The VSA includes software logic that processes host I/O requests by performing various data processing tasks to efficiently organize and persistently store the specified user data in user accessible storage objects that are built by the VSA.

The total cost of ownership for a VSA reflects the cost of backend storage used by the VSA, as well as the cost of the virtual machine instances that are used as nodes of the VSA.

SUMMARY

In the disclosed technology, multiple virtual disk instances are created, each one of which is a virtual machine. Each one of the virtual disk instances aggregates non-volatile data storage of multiple cloud storage volumes that are directly attached only to that virtual disk instance into a single logical volume of non-volatile data storage corresponding to that virtual disk instance.

The disclosed technology creates a sub-network that connects the virtual disk instances to a network interface of each one of multiple storage controllers of the virtual storage appliance. Each one of the storage controllers in the virtual storage appliance consumes, over the sub-network, the logical volumes of non-volatile data storage corresponding to the virtual disk instances, in order to persistently store user data received by the virtual storage appliance from one or more host devices.

In some embodiments, each one of the cloud storage volumes is capable of being attached to only a single virtual machine, and each one of the cloud storage volumes is attached to only one of the virtual disk instances, through a data storage interface of that virtual disk instance.

In some embodiments, creating the multiple virtual disk instances includes determining a maximum number of cloud storage volumes that can be attached to individual ones of the virtual disk instances, and attaching, to each one of the virtual disk instances, the maximum number of cloud storage volumes that can be attached to individual ones of the virtual disk instances.

In some embodiments, a total data storage capacity of the virtual storage appliance is increased at least in part by calculating a desired amount of increase in the total data storage capacity for the virtual storage appliance, calculating a per-cloud storage volume increment by dividing the amount of increase by a product of the total number of the virtual disk instances and the total number of cloud storage volumes that are attached to each one of the virtual disk instances, and increasing the data storage capacity of each one of the cloud storage volumes by the calculated per-cloud storage volume increment. Increasing the total data storage capacity of the virtual storage appliance may further includes detecting, by each one of the virtual disk instances, the increased data storage capacities of the cloud storage volumes attached to that virtual disk instance, and exposing, by each one of the virtual disk instances to the multiple storage controllers of the virtual storage appliance, a larger logical volume of non-volatile data storage reflecting the increased data storage capacities of the cloud storage volumes attached to that virtual disk instance. The multiple storage controllers of the virtual storage appliance then detect the larger logical volumes exposed by the virtual disk instances and use the larger logical volumes exposed by the virtual disk instances to persistently store user data received by the virtual storage appliance from the one or more host devices.

In some embodiments, a total data storage capacity of the virtual storage appliance may be increased by, for each one of the virtual disk instances, creating a new cloud storage volume for that virtual disk instance and attaching the new cloud storage volume to that virtual disk instance. Each one of the virtual disk instances then detects the new cloud storage volume attached to that virtual disk instance and exposes, to the multiple storage controllers of the virtual storage appliance, a larger logical volume of non-volatile data storage reflecting a new total number of cloud storage volumes attached to that virtual disk instance. The multiple storage controllers of the virtual storage appliance then detect the larger logical volumes exposed by the virtual disk instances, and use the larger logical volumes exposed by the virtual disk instances to persistently store user data received by the virtual storage appliance from the one or more host devices.

In some embodiments, a total data storage capacity of the virtual storage appliance may be increased by creating a plurality of new cloud storage volumes, creating a new virtual disk instance, attaching the new cloud storage volumes to the new virtual disk instance, and aggregating, by the new virtual disk instance, non-volatile data storage of the new cloud storage volumes into a new logical volume of non-volatile data storage corresponding to the new virtual disk instance. The new virtual disk instance then exposes the new logical volume of non-volatile data storage to the multiple storage controllers of the virtual storage appliance, and the multiple storage controllers of the virtual storage appliance detect the new logical volume and use the new logical volume exposed by the new virtual disk instance to persistently store user data received by the virtual storage appliance from the one or more host devices. The virtual disk instances may have a first instance type, and the first instance type may have a first IOPS limit. In response to detecting that the first IOPS limit is excessively high following the addition of the new virtual disk instance, the disclosed technology may perform a number of steps for each one of the virtual disk instances, including i) stopping execution of the virtual disk instance, ii) changing the instance type of the virtual disk instance from the first instance type to a second instance type, wherein the second instance type has a lower IOPS limit than the IOPS limit of the first instance type (and accordingly a lower cost of ownership), and iii) restarting execution of the virtual disk instance.

In some embodiments, the disclosed technology increases the IOPS (Input/Output Operations per Second) performance of the virtual storage appliance by i) determining a total desired amount of IOPS increase for the virtual storage appliance, ii) calculating a per-cloud storage volume amount of IOPS increase that is equal to the total desired amount of IOPS increase for the virtual storage appliance divided by a total number of the cloud storage volumes, and iii) increasing the IOPS limit for each one of the cloud storage volumes by the per-cloud storage volume amount of IOPS increase.

In some embodiments, the disclosed technology may increase IOPS (Input/Output Operations per Second) performance of the virtual storage appliance at least in part by performing the following steps for each one of the virtual disk instances i) stopping execution of the virtual disk instance, ii) changing the instance type of the virtual disk instance from the first instance type to a second instance type, wherein the second instance type has a higher IOPS limit than an IOPS limit of the first instance type, and iii) restarting execution of the virtual disk instance.

In some embodiments, the disclosed technology increases IOPS (Input/Output Operations per Second) performance of the virtual storage appliance at least in part by i) creating a set of new cloud storage volumes, ii) creating a new virtual disk instance, iii) attaching the set of new cloud storage volumes to the new virtual disk instance, iv) aggregating, by the new virtual disk instance, non-volatile data storage of the set of new cloud storage volumes into a new logical volume of non-volatile data storage corresponding to the new virtual disk instance, v) exposing, by the new virtual disk instance, to the storage controllers of the virtual storage appliance, the new logical volume of non-volatile data storage, vi) detecting, by the storage controllers of the virtual storage appliance, the new logical volume, and vii) using, by the storage controllers of the virtual storage appliance, the new logical volume exposed by the new virtual disk instance to persistently store user data received by the virtual storage appliance from the one or more host devices.

The disclosed technology is integral to a practical and cost-effective technical solution for providing backend non-volatile data storage for a virtual storage appliance. The disclosed technology provides backend non-volatile data storage for a virtual storage appliance such that the total cost of ownership for the virtual storage appliance is less than would result from using other technologies. By enabling the use of cloud storage volumes that are capable of being attached to only single virtual machines ("single-attach" storage volumes), the disclosed technology avoids the need for using more costly cloud storage volumes that are capable of being simultaneously directly attached to multiple virtual machine instances ("multi-attach" storage volumes). Because multi-attach cloud storage volumes are significantly higher cost than single-attach cloud storage volumes, the disclosed technology greatly reduces the total cost of ownership for virtual storage appliances in which it is embodied.

Additionally, the disclosed technology avoids higher costs and/or performance limitations related to the specific type of instances used for storage controllers of the virtual storage appliance. The cost of each instance typically reflects the size of the IOPS (Input/Output Operations Per Second) limit on the data storage interface of the instance, with more expensive instances having higher IOPS limits. By consuming logical volumes provided by virtual disk instances over a subnetwork, and through the network interfaces of the storage controllers, the disclosed technology avoids the performance limitations resulting from using less expensive instance types as storage controllers, and/or the need to use more expensive instance types for their higher IOPS limits on their data storage interfaces.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

FIG. 4 is a flow chart showing another example of steps performed in some embodiments.

DETAILED DESCRIPTION

Figure 1:
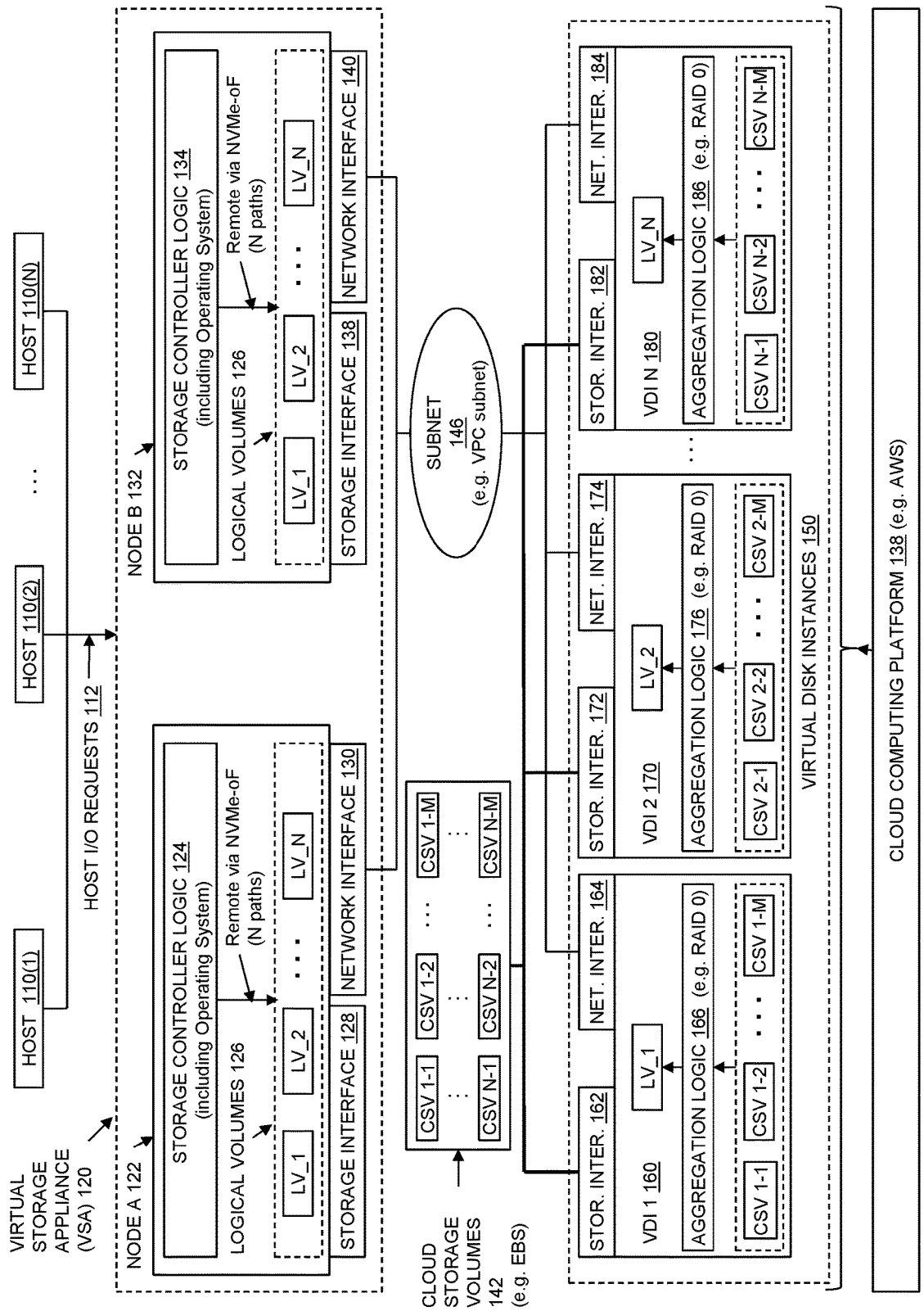
FIG. 1 is a block diagram showing an example of a virtual storage appliance and virtual disk instances in an illustrative embodiment of the disclosed technology.

Embodiments will now be described with reference to the figures. The embodiments described herein are provided only as examples, in order to illustrate various features and principles of the disclosed technology, and are not limiting. The embodiments of disclosed technology described herein are integrated into a practical solution for providing backend non-volatile data storage for a virtual storage appliance.

In the disclosed technology, multiple virtual disk instances are created, each one of which is a virtual machine, and each one of which aggregates non-volatile data storage of multiple cloud storage volumes that are directly attached only to that virtual disk instance into a single logical volume of non-volatile data storage corresponding to that virtual disk instance. A sub-network is created that connects the virtual disk instances to a network interface of each one of multiple storage controllers of a virtual storage appliance. Each one of the storage controllers in the virtual storage appliance consumes, over the sub-network, the logical volumes of non-volatile data storage corresponding to the virtual disk instances, in order to persistently store user data received by the virtual storage appliance from one or more host devices. Each one of the cloud storage volumes is capable of being attached to only a single virtual machine, and each one of the cloud storage volumes is attached to only one of the virtual disk instances, through a data storage interface of that virtual disk instance. Creating the multiple virtual disk instances may include determining a maximum number of cloud storage volumes that can be attached to individual ones of the virtual disk instances, and attaching, to each one of the virtual disk instances, the maximum number of cloud storage volumes that can be attached to individual ones of the virtual disk instances.

A total data storage capacity of the virtual storage appliance may be increased by first calculating a desired amount of increase in the total data storage capacity for the virtual storage appliance relative to a current total data storage capacity. A per-cloud storage volume increment is then calculated by dividing the amount of increase in the total data storage capacity for the virtual storage appliance by a product of a total number of the virtual disk instances and a total number of cloud storage volumes that are attached to each one of the virtual disk instances. The data storage capacity of each one of the cloud storage volumes is then increased by the per-cloud storage volume increment. Each one of the virtual disk instances detects the increased data storage capacities of the cloud storage volumes attached to that virtual disk instance, and exposes, to the multiple storage controllers of the virtual storage appliance, a larger logical volume of non-volatile data storage reflecting the increased data storage capacities of the cloud storage volumes attached to that virtual disk instance. The multiple storage controllers of the virtual storage appliance detect the larger logical volumes exposed by the virtual disk instances and use the larger logical volumes exposed by the virtual disk instances to persistently store user data received by the virtual storage appliance from the one or more host devices.

The performance (e.g. IOPS) of the virtual storage appliance may be increased by determining a desired amount of IOPS increase for the virtual storage appliance, and then calculating a per-cloud storage volume amount of IOPS increase that is equal to the total amount of IOPS increase for the virtual storage appliance divided by a total number of cloud storage volumes. The IOPS provisioned for each one of the cloud storage volumes is then increased by the per-cloud storage volume amount.

The performance (e.g. IOPS) of the virtual storage appliance may also be increased by performing the following steps for each one of the virtual disk instances: i) stopping execution of the virtual disk instance, ii) changing the instance type of the virtual disk instance from a first instance type to a second instance type, where the second instance type has a higher IOPS limit than an IOPS limit of the first instance type, and iii) restarting execution of the virtual disk instance.

FIG. 1 is a block diagram showing an operational environment for the disclosed technology, including Virtual Storage Appliance (VSA) 120 and Virtual Disk Instances 150 in which the disclosed technology may be embodied. VSA 120 and Virtual Disk Instances 150 execute on a public cloud computing platform, shown in FIG. 1 by Cloud Computing Platform 138. VSA 120 includes multiple storage controllers, shown by Node A 122 and Node B 132. Cloud Computing Platform 138 may include a hypervisor or the like, executing on one or more server computer systems, and Node A 122 Node B 132 each execute on Cloud Computing Platform 138 as an instance of a virtual machine type provided by Cloud Computing Platform 138. Each one of the Virtual Disk Instances 150 also executes on Cloud Computing Platform 138 as an instance of a virtual machine type provided by Cloud Computing Platform 138. Each instance provided by Cloud Computing Platform 138 is an instance of a virtual machine type that is defined by Cloud Computing Platform 138, and is subject to performance constraints on that type of instance, e.g. limits on storage IOPS, network throughput, etc., as are defined for that type by the Cloud Computing Platform 138.

Cloud Computing Platform 138 may, for example, consist of or include Amazon Web Services (AWS) operated by Amazon.com, Inc., Azure operated by Microsoft Corporation, and/or some other specific cloud computing platform. Node A 122, Node B 132, and Virtual Disk Instances 150 are program code (software) that executes on cloud resources of Cloud Computing Platform 138 that are provisioned from Cloud Computing Platform 138 for execution of Node A 122, Node B 132, and the Virtual Disk Instances 150. Such resources may include one or more processors (e.g., one or more central processing units (CPUs)), memory, and storage I/O and network communication interface resources of one or more server computer systems in Cloud Computing Platform 138.

Node A 122, Node B 132, and the Virtual Disk Instances 150, together with the cloud compute and other resources of Cloud Computing Platform 138 that are provisioned from Cloud Computing Platform 138 for execution of Node A 122, Node B 132, and the Virtual Disk Instances 150, form control circuitry that is configured and arranged to carry out various methods and functions described herein. Node A 122, Node B 132, and the Virtual Disk Instances 150 include a variety of software components that may be provided in the form of executable program code. For example, Node A 122 and Node B 132 may respectively include software components such as Storage Controller Logic 124 and Storage Controller Logic 134. Each one of the virtual disk instances may include aggregation logic, e.g. Aggregation Logic 166 in Virtual Disk Instance 1 160, Aggregation Logic 176 in Virtual Disk Instance 2 170, and so on through Aggregation Logic 186 in Virtual Disk Instance N 180. When instructions in the program code are executed by the cloud compute resources of Cloud Computing Platform 138 that are provisioned for execution of Node A 122, Node B 132, and Virtual Disk Instances 150, those cloud compute resources are caused to carry out the operations of the software components described herein. Although certain software components are shown in the Figures and described herein for purposes of illustration and explanation, those skilled in the art will recognize that VSA 120 and/or Virtual Disk Instances 150 may also include various other specific types of software components that are not shown.

Host Computing Devices 110, referred to as "hosts", are shown for purposes of illustration by Hosts 110(1) through 110(N). Hosts 110 may be virtual and/or physical computing devices. The Hosts 110 and/or applications executing thereon access non-volatile data storage served by VSA 120. For example, Hosts 110 issue Host I/O Requests 112 on behalf of applications executing on Hosts 110. Host I/O Requests 112 may include read and/or write I/O requests. VSA 120 receives Host I/O Requests 112, and Storage Controller Logic 124 and/or Storage Controller Logic 134 processes the Host I/O Requests 112. Processing of Host I/O Requests 112 includes using portions of non-volatile data storage from backend logical volumes, such as Logical Volumes 126, to create user accessible storage objects that store user data and are accessed by the Host I/O Requests 112. The user accessible storage objects may, for example, include file-level storage objects (e.g. files), and/or block-level storage objects (e.g. virtual disks), and Host I/O Requests 112 may include file-based and/or block-based I/O requests that access those storage objects.

In an initial configuration, the types and capabilities of instances selected for Node A 122, Node B 132, and Virtual Disk Instances 150 support an initial performance (e.g. IOPS) and total storage capacity for Virtual Storage Appliance 120, while minimizing costs. In embodiments in which the Cloud Computing Platform 138 is AWS, the instances may be created using Amazon Elastic Compute Cloud (EC2). Because backend cloud storage volumes (Cloud Storage Volumes 142) are not directly attached to Node A 122 and Node B 132, per-instance storage performance limits for Node A 122 and Node B 132 (e.g. performance limits on Storage Interface 128 and Storage Interface 138) can be ignored. Instead, the instance type of Node A 122 and Node A 132 can be selected based on network performance limitations, e.g. by selecting instance types that have sufficiently high network performance limits (e.g. on Network Interface 130 and Network Interface 140) to provide acceptable performance when accessing Cloud Storage Volumes 142 over Subnet 146. Since network performance is less costly than storage performance in public cloud instances, a significant savings can thus be obtained using the disclosed technology.

When selecting an initial instance type for the virtual disk instances in Virtual Disk Instances 150, both the specific instance type and total number N of virtual disk instances may be selected to minimize costs while providing the desired performance and total capacity for Virtual Storage Appliance 120. A main consideration in this regard is selecting an instance type for each virtual disk instance with the best cost/performance metric that provides 1/N of the desired overall performance for the VSA 120. Because the processing requirements of the virtual disk instances in the disclosed technology are relatively small, the virtual disk instances can advantageously be deployed on less expense CPU resources of the Cloud Computing Platform 138, e.g. using ARM64 Graviton processors in AWS, thus reducing total cost of ownership.

When creating the M cloud storage volumes initially attached to each one of the virtual disk instances, the number M may be selected such that it is large enough to provide the total desired capacity for the VSA 120, while leveraging any free performance provided with certain types of cloud storage volumes. For example, in the case where the Cloud Computing Platform 138 is AWS, each one of the cloud storage volumes in Cloud Storage Volumes 142 may be a gp3 general purpose SSD (Solid State Drive) storage volume created from Amazon Elastic Block Store (Amazon EBS). In such a case, the total number M may be selected at least in part based on the 3 KB IOPS free performance provided with each individual gp3 cloud storage volume.

During operation of the components shown in FIG. 1, the N virtual disk instances in Virtual Disk Instances 150 may, for example, be created at least in part by or using storage controller logic, such as Storage Controller Logic 124 and/or Storage Controller Logic 134. In the example of FIG. 1, the N Virtual Disk Instances 150 include Virtual Disk Instance 1 160, Virtual Disk Instance 2 170, and so on through Virtual Disk Instance N 180. Each one of the virtual disk instances in Virtual Disk Instances 150 aggregates non-volatile data storage of a corresponding set of M cloud storage volumes that are directly attached only to that virtual disk instance into a single logical volume of non-volatile data storage that corresponds to that virtual disk instance.

In the example of FIG. 1, the cloud storage volumes CSV 1-1 through CSV 1-M are directly attached to the Storage Interface 162 of Virtual Disk Instance 1 160, the cloud storage volumes CSV 2-1 through CSV 2-M are directly attached to the Storage Interface 172 of Virtual Disk Instance 170, and so on through cloud storage volumes CSV N-1 through CSV N-M which are directly attached to the Storage Interface 182 of Virtual Disk Instance 180. Aggregation Logic 166 in Virtual Disk Instance 160 aggregates non-volatile data storage of the cloud storage volumes CSV 1-1 through CSV 1-M into the logical volume LV_1, Aggregation Logic 176 in Virtual Disk Instance 170 aggregates non-volatile data storage of the cloud storage volumes CSV 2-1 through CSV 2-M into the logical volume LV_2, and so on through Aggregation Logic 186 in Virtual Disk Instance N 180, which aggregates non-volatile data storage of the cloud storage volumes CSV N-1 through CSV N-M into logical volume LV_N.

The aggregation of cloud storage volumes may, for example, be performed by Aggregation Logic 166, Aggregation Logic 176, and so on through Aggregation Logic 186, at least in part using RAID (Redundant Array of Independent Disks) 0 or the like.

Storage Controller Logic 124 and/or Storage Controller Logic 134 create a sub-network (Subnet 146) that connects a network interface of each one of the virtual disk instances in Virtual Disk Instances 150 to both the Network Interface 130 of Node A 122 and the Network Interface 140 of Node B 132. Specifically, Subnet 146 connects the Network Interface 162 of Virtual Disk Instance 1 160, Network Interface 172 of Virtual Disk Instance 2, and so on, through Network Interface 182 of Virtual Disk Instance N 180, to both Network Interface 130 of Node A 122 and Network Interface 140 of Node B 132. Subnet 146 may, for example, be a subnet that is added to a Virtual Private Cloud (VPC) in AWS.

Storage Controller Logic 124 in Node A 122 and Storage Controller Logic 134 in Node B 132 consume, over Subnet 146, the logical volumes of non-volatile data storage corresponding to the individual Virtual Disk Instances 150, as shown by Logical Volumes 126, and use the logical volumes to persistently store user data received by Virtual Storage Appliance 120 from the Hosts 110 in user accessible storage objects. For example, Storage Controller Logic 124 in Node A 122 and Storage Controller Logic 134 in Node B 132 may each consume the logical volumes in Logical Volumes 126 over N data paths through Subnet 146 using NVM (Non-Volatile Memory) Express over Fabrics (NVMe-oF). In addition, Storage Controller Logic 124 in Node A 122 and Storage Controller Logic 134 in Node B 132 may each apply RAID 5, RAID 6, or some other data protection and recovery system over the Logical Volumes 126 in order to maintain access to the data stored in Logical Volumes 126 in the event that one or more of the virtual disk instances in Virtual Disk Instances 150 fails.

Each one of the Cloud Storage Volumes 142 is capable of being attached to only a single virtual machine instance. For example, each one of the Cloud Storage Volumes 142 may be an AWS gp3 cloud storage volume, which is only capable of being attached to a single instance. As shown in FIG. 1, each one of the cloud storage volumes in Cloud Storage Volumes 142 is attached to only one of the virtual disk instances in Virtual Disk Instances 150, through a data storage interface of that virtual disk instance.

Creation of the Virtual Disk Instances 150 may include determining a maximum number of cloud storage volumes that can be attached to individual ones of the Virtual Disk Instances 150. For example, the number M of cloud storage volumes that are attached to each individual one of the Virtual Disk Instances 150 may be equal to a maximum number of attachment slots that are available in each one of the Virtual Disk Instances 150. The maximum number of cloud storage volumes that can be attached to individual ones of the virtual disk instances in Virtual Disk Instances 150 are then attached to each one of the virtual disk instances in Virtual Disk Instances 150.

In some embodiments, a total data storage capacity Virtual Storage Appliance 120 may be increased (e.g. by Storage Controller Logic 124 and/or Storage Controller Logic 134) at least in part by first calculating an amount of the desired increase in the total data storage capacity for Virtual Storage Appliance 120, relative to its current total data storage capacity. A per-cloud storage volume increment is then calculated by dividing the amount of increase by a product of the total number of the virtual disk instances (e.g. N) and the total number of cloud storage volumes that are attached to each one of the virtual disk instances (e.g. M). The data storage capacity of each one of the cloud storage volumes in Cloud Storage Volumes 142 is then increased by the per-cloud storage volume increment.

Increasing the total data storage capacity of Virtual Storage Appliance 120 may further include the aggregation logic in each one of the virtual disk instances in Virtual Disk Instances 150 detecting the increased data storage capacities of the cloud storage volumes attached to that virtual disk instance, and then exposing, to both Node A 122 and Node B 132, a larger logical volume of non-volatile data storage reflecting the increased data storage capacities of the cloud storage volumes attached to that virtual disk instance. Accordingly, Virtual Disk Instance 1 160 exposes a larger logical volume LV_1, Virtual Disk Instance 2 170 exposes a larger logical volume LV_2, and so on through Virtual Disk Instance N 180, which exposes a larger logical volume LV_N. Node A 122 and Node B 132 then detect the larger logical volumes exposed by the virtual disk instances, and use the larger logical volumes exposed by the virtual disk instances to persistently store user data received by Virtual Storage Appliance 120 from the Hosts 110.

The performance (e.g. total IOPS) of Virtual Storage appliance 120 may be increased (e.g. by Storage Controller Logic 124 and/or Storage Controller Logic 134) at least in part by first determining an amount of IOPS increase for the virtual storage appliance, relative to its current total IOPS. A per-cloud storage volume amount of IOPS increase is then calculated that is equal to the amount of IOPS increase divided by a total number of cloud storage volumes (N×M). The IOPS provisioned for each one of the cloud storage volumes is then increased by the per-cloud storage volume amount.

The performance (e.g. IOPS) of the Virtual Storage Appliance 120 may alternatively be increased (e.g. by Storage Controller Logic 124 and/or Storage Controller Logic 134) at least in part by performing the following steps for each one of the virtual disk instances Virtual Disk Instances 150: First, execution of the virtual disk instance is stopped. Next, the instance type of the virtual disk instance is changed from its current instance type to a new instance type, where the new instance type has a higher IOPS limit than the IOPS limit of the current instance type. Finally, execution of the virtual disk instance is restarted using the new instance type.

Figure 2:
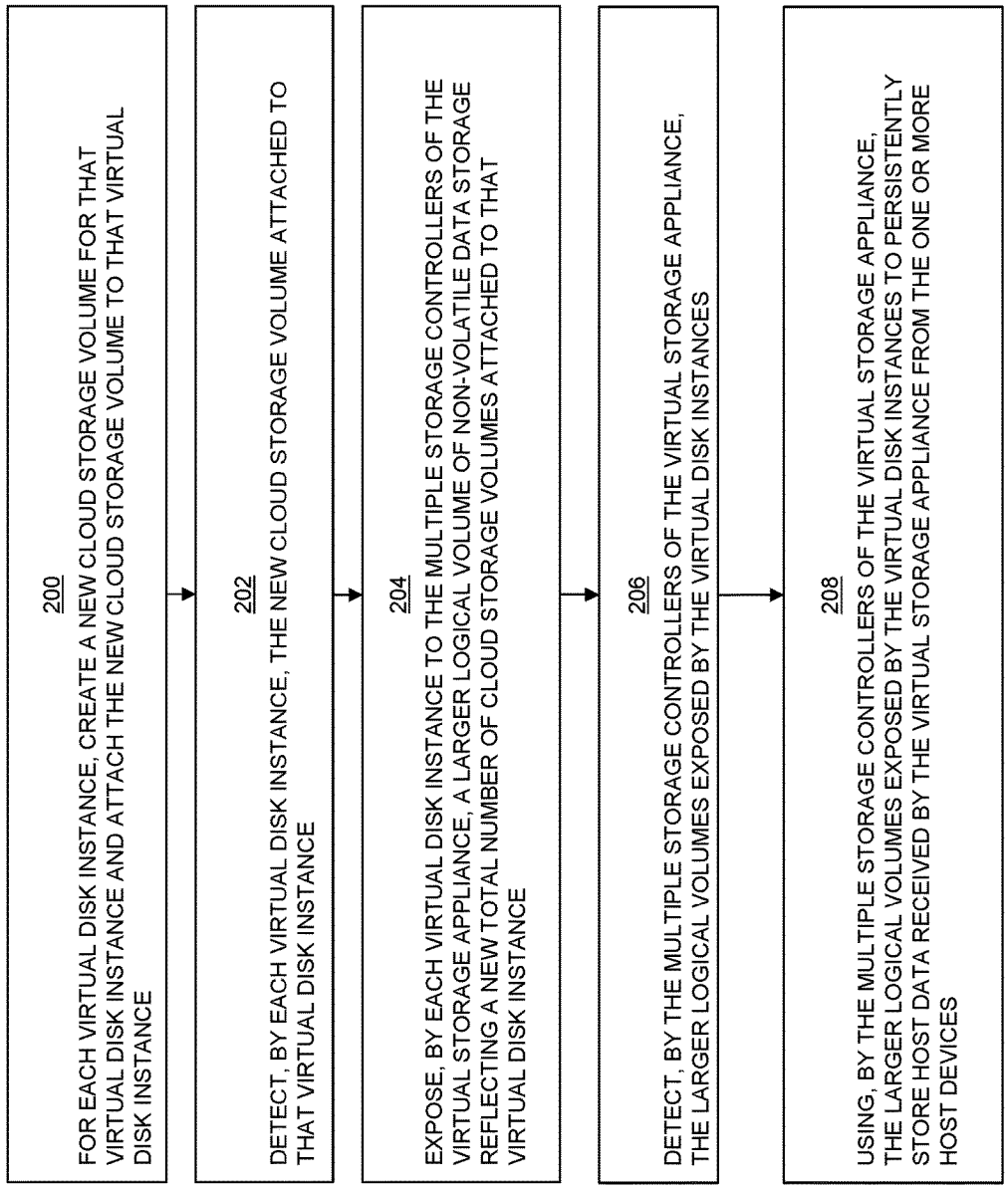
FIG. 2 is a flow chart illustrating steps performed in some embodiments to add new cloud storage volumes.

FIG. 2 is a flow chart illustrating steps performed in some embodiments to add new cloud storage volumes to the virtual disk instances. The steps of FIG. 2 may be performed at least in part by Storage Controller Logic 124, Storage Controller Logic 134, and/or the aggregation logic in Virtual Disk Instances 150. The steps of FIG. 2 may be performed to increase a total data storage capacity of Virtual Storage Appliance 120, or to increase the overall performance (e.g. IOPS) of Virtual Storage Appliance 120.

At step 200, for each one of the virtual disk instances, a new cloud storage volume is created and attached to the virtual disk instance.

At step 202, each virtual disk instance detects the new cloud storage volume that has been attached to it, and generates a larger corresponding logical volume by aggregating the non-volatile data storage of the newly attached cloud storage volume together with the cloud storage volumes previously attached to it.

At step 204, each virtual disk instance exposes, to the multiple storage controllers of the virtual storage appliance, over the subnet, the larger logical volume of non-volatile data storage reflecting the new total number of cloud storage volumes attached to that virtual disk instance.

At step 206, the multiple storage controllers of the virtual storage appliance detect the larger logical volumes exposed by the virtual disk instances.

At step 208, the multiple storage controllers of the virtual storage appliance use the larger logical volumes exposed by the virtual disk instances to persistently store host data received by the virtual storage appliance from the one or more host devices.

Figure 3:
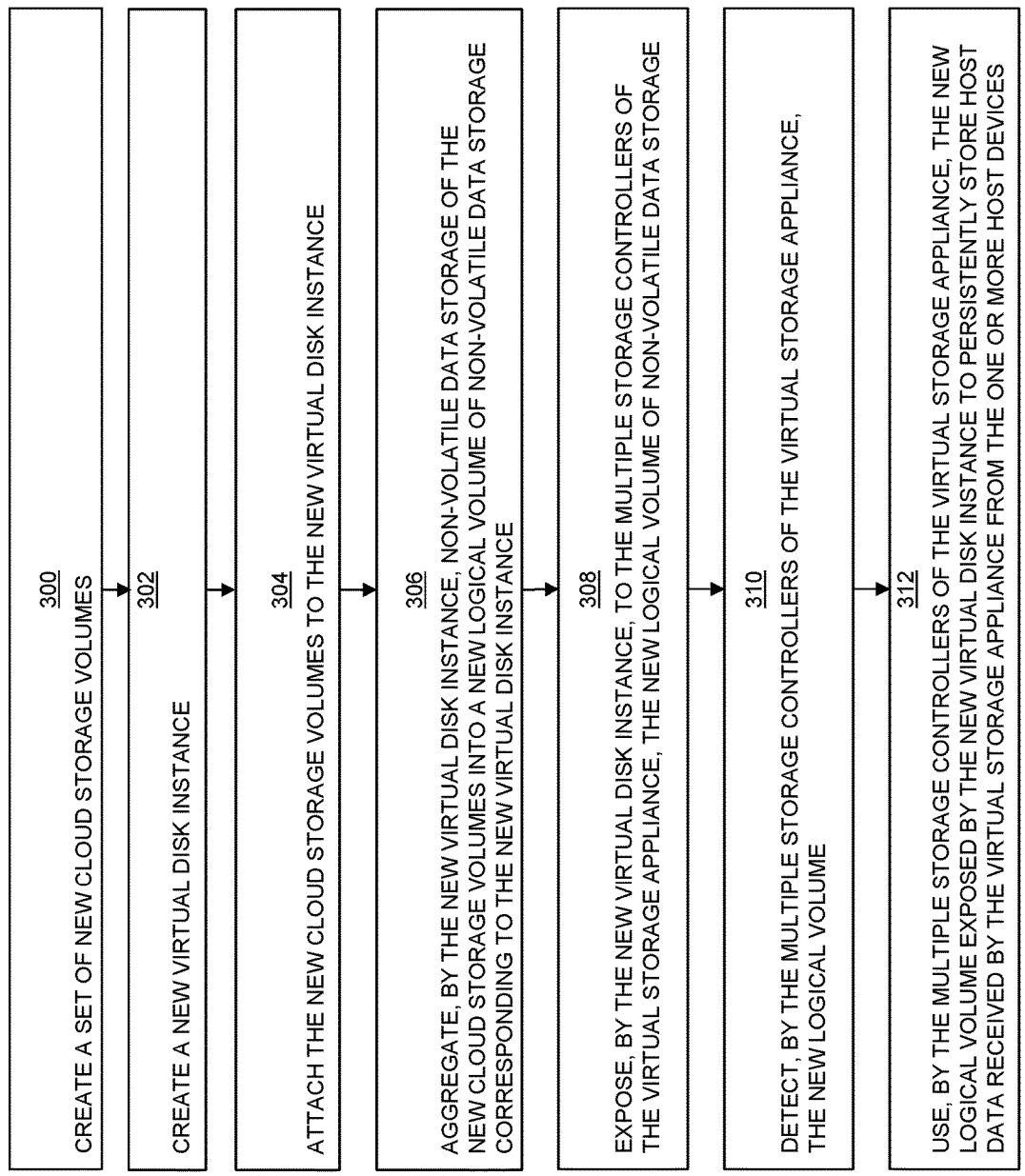
FIG. 3 is a flow chart illustrating steps performed in some embodiments to add a new virtual disk instance.

FIG. 3 is a flow chart illustrating steps performed in some embodiments to add a new virtual disk instance. The steps of FIG. 3 may be performed at least in part by Storage Controller Logic 124, Storage Controller Logic 134, and/or the aggregation logic in Virtual Disk Instances 150. The steps of FIG. 2 may be performed to increase a total data storage capacity of Virtual Storage Appliance 120, or to increase the overall performance (e.g. IOPS) of Virtual Storage Appliance 120.

At step 300, a new set of new cloud storage volumes is created.

At step 302, a new virtual disk instance is created.

At step 304, the new set of cloud storage volumes are attached to the new virtual disk instance.

At step 306, aggregate, the new virtual disk instance aggregates the non-volatile data storage of the set of new cloud storage volumes into a new logical volume of non-volatile data storage corresponding to the new virtual disk instance.

At step 308, the new virtual disk instance exposes the new logical volume of non-volatile data storage to the multiple storage controllers of the virtual storage appliance over the subnet.

At step 310, the multiple storage controllers of the virtual storage appliance detect the new logical volume.

At step 312, the storage controllers of the virtual storage appliance use the new logical volume exposed by the new virtual disk instance to persistently store host data received by the virtual storage appliance from the one or more host devices.

The virtual disk instances, including the virtual disk instance added through the steps of FIG. 3, may have an initial instance type having a corresponding IOPS limit. The addition of a new virtual disk instance may result in a new cumulative IOPS provided by the new set of virtual disk instances being more than is needed to support the requirements of the virtual storage appliance. In such a case, the corresponding IOPS limit of the initial instance type for the virtual disk instances is excessively high, and is introducing an unnecessary cost. In response to detecting that the corresponding IOPS limit for the initial instance type of the virtual disk instances is excessively high, the disclosed technology performs a number of steps for each one of the virtual disk instances. First, execution of the virtual disk instance is stopped. The instance type of the virtual disk instance is then changed from the initial instance type to a new instance type, where the new instance type has a lower IOPS limit than the IOPS limit of the initial instance type, and is accordingly less expensive. Execution of the virtual disk instance is then restarted with the new instance type. Such changing to a new instance type having a relatively lower IOPS reduces total cost of ownership, since instance types with relatively lower IOPS limits are less costly.

FIG. 4 is a flow chart showing another example of steps performed in some embodiments to provide backend non-volatile data storage for a virtual storage appliance.

At step 400, multiple virtual disk instances are created. Each one of the virtual disk instances is a virtual machine, and each one of the virtual disk instances aggregates non-volatile data storage of a plurality of cloud storage volumes that are directly attached only to that virtual disk instance into a single logical volume of non-volatile data storage corresponding to that virtual disk instance.

At step 402, a sub-network is created that connects the virtual disk instances to a network interface of each one of multiple storage controllers of a virtual storage appliance.

At step 404, each one of the multiple storage controllers in the virtual storage appliance consumes, over the sub-network, the logical volumes of non-volatile data storage corresponding to the virtual disk instances to persistently store host data received by the virtual storage appliance from one or more host devices.

As will be appreciated by those skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
   creating a plurality of virtual disk instances, wherein each one of the virtual disk instances is a virtual machine, and wherein each one of the virtual disk instances aggregates non-volatile data storage of a plurality of cloud storage volumes that are directly attached only to that virtual disk instance into a single logical volume of non-volatile data storage corresponding to that virtual disk instance;
   creating a sub-network that connects the virtual disk instances to a network interface of each one of multiple storage controllers of a virtual storage appliance; and
   consuming, over the sub-network by each one of the multiple storage controllers in the virtual storage appliance, the logical volumes of non-volatile data storage corresponding to the virtual disk instances to persistently store user data received by the virtual storage appliance from one or more host devices.

2. The method of claim 1, wherein each one of the cloud storage volumes is capable of being attached to only a single virtual machine; and
   wherein each one of the cloud storage volumes is attached to one of the virtual disk instances through a data storage interface of that virtual disk instance.

3. The method of claim 2, wherein creating the plurality virtual disk instances further comprises:
   determining a maximum number of cloud storage volumes that can be attached to individual ones of the virtual disk instances; and
   attaching, to each one of the virtual disk instances, the maximum number of cloud storage volumes that can be attached to individual ones of the virtual disk instances.

4. The method of claim 3, further comprising:
   increasing a total data storage capacity of the virtual storage appliance at least in part by:
      calculating an amount of increase in the total data storage capacity for the virtual storage appliance,
      calculating a per-cloud storage volume increment by dividing the amount of increase in the total data storage capacity for the virtual storage appliance by a product of a total number of the virtual disk instances and a total number of cloud storage volumes that are attached to each one of the virtual disk instances, and
      increasing a data storage capacity of each one of the cloud storage volumes by the per-cloud storage volume increment.

5. The method of claim 4, wherein increasing the total data storage capacity of the virtual storage appliance further comprises:
- detecting, by each one of the virtual disk instances, the increased data storage capacities of the cloud storage volumes attached to that virtual disk instance;
- exposing, by each one of the virtual disk instances to the multiple storage controllers of the virtual storage appliance, a larger logical volume of non-volatile data storage reflecting the increased data storage capacities of the cloud storage volumes attached to that virtual disk instance;
- detecting, by the multiple storage controllers of the virtual storage appliance, the larger logical volumes exposed by the virtual disk instances; and
- using, by the multiple storage controllers of the virtual storage appliance, the larger logical volumes exposed by the virtual disk instances to persistently store user data received by the virtual storage appliance from the one or more host devices.

6. The method of claim 2, further comprising:
increasing a total data storage capacity of the virtual storage appliance at least in part by:
- for each one of the virtual disk instances, creating a new cloud storage volume for that virtual disk instance and attaching the new cloud storage volume to that virtual disk instance,
- detecting, by each one of the virtual disk instances, the new cloud storage volume attached to that virtual disk instance,
- exposing, by each one of the virtual disk instances to the multiple storage controllers of the virtual storage appliance, a larger logical volume of non-volatile data storage reflecting a new total number of cloud storage volumes attached to that virtual disk instance,
- detecting, by the multiple storage controllers of the virtual storage appliance, the larger logical volumes exposed by the virtual disk instances, and
- using, by the multiple storage controllers of the virtual storage appliance, the larger logical volumes exposed by the virtual disk instances to persistently store user data received by the virtual storage appliance from the one or more host devices.

7. The method of claim 3, further comprising:
increasing a total data storage capacity of the virtual storage appliance at least in part by:
- creating a plurality of new cloud storage volumes,
- creating a new virtual disk instance,
- attaching the new cloud storage volumes to the new virtual disk instance,
- aggregating, by the new virtual disk instance, non-volatile data storage of the new cloud storage volumes into a new logical volume of non-volatile data storage corresponding to the new virtual disk instance,
- exposing, by the new virtual disk instance, to the multiple storage controllers of the virtual storage appliance, the new logical volume of non-volatile data storage,
- detecting, by the multiple storage controllers of the virtual storage appliance, the new logical volume, and
- using, by the multiple storage controllers of the virtual storage appliance, the new logical volume exposed by the new virtual disk instance to persistently store user data received by the virtual storage appliance from the one or more host devices.

8. The method of claim 7, wherein the virtual disk instances have a first instance type, wherein the first instance type has a first IOPS performance limit, and further comprising:
in response to detecting that the first IOPS performance limit is excessively high, performing the following steps for each one of the virtual disk instances:
- stopping execution of the virtual disk instance,
- changing the instance type of the virtual disk instance from the first instance type to a second instance type, wherein the second instance type has a lower IOPS performance limit than the IOPS performance limit of the first instance type; and
- restarting execution of the virtual disk instance.

9. The method of claim 2, further comprising:
increasing IOPS (Input/Output Operations per Second) performance of the virtual storage appliance at least in part by:
- determining a total amount of IOPS increase for the virtual storage appliance;
- calculating a per-cloud storage volume amount of IOPS increase that is equal to the total amount of IOPS increase for the virtual storage appliance divided by a total number of cloud storage volumes; and
- increasing IOPS provisioned for each one of the cloud storage volumes by the per-cloud storage volume amount.

10. The method of claim 2, further comprising:
increasing IOPS (Input/Output Operations per Second) performance of the virtual storage appliance at least in part by performing the following steps for each one of the virtual disk instances:
- stopping execution of the virtual disk instance,
- changing the instance type of the virtual disk instance from the first instance type to a second instance type, wherein the second instance type has a higher IOPS performance limit than an IOPS limit of the first instance type; and
- restarting execution of the virtual disk instance.

11. The method of claim 2, further comprising:
increasing IOPS (Input/Output Operations per Second) performance of the virtual storage appliance at least in part by:
- creating a plurality of new cloud storage volumes,
- creating a new virtual disk instance,
- attaching the new cloud storage volumes to the new virtual disk instance,
- aggregating, by the new virtual disk instance, non-volatile data storage of the new cloud storage volumes into a new logical volume of non-volatile data storage corresponding to the new virtual disk instance,
- exposing, by the new virtual disk instance, to the multiple storage controllers of the virtual storage appliance, the new logical volume of non-volatile data storage,
- detecting, by the multiple storage controllers of the virtual storage appliance, the new logical volume, and
- using, by the multiple storage controllers of the virtual storage appliance, the new logical volume exposed by the new virtual disk instance to persistently store user data received by the virtual storage appliance from the one or more host devices.

12. A system comprising:
a virtual storage appliance executing on a cloud computing platform, wherein the virtual storage appliance includes program code for providing backend non-volatile data storage for the virtual storage appliance;
wherein the program code, when executed by computing resources of the cloud computing platform including at least one central processing unit, causes the computing resources to:
  create a plurality of virtual disk instances, wherein each one of the virtual disk instances is a virtual machine, and wherein each one of the virtual disk instances aggregates non-volatile data storage of a plurality of cloud storage volumes that are directly attached only to that virtual disk instance into a single logical volume of non-volatile data storage corresponding to that virtual disk instance;
  create a sub-network that connects the virtual disk instances to a network interface of each one of multiple storage controllers of a virtual storage appliance; and
  consume, over the sub-network by each one of the multiple storage controllers in the virtual storage appliance, the logical volumes of non-volatile data storage corresponding to the virtual disk instances to persistently store user data received by the virtual storage appliance from one or more host devices.

13. The system of claim 12, wherein each one of the cloud storage volumes is capable of being attached to only a single virtual machine; and
  wherein each one of the cloud storage volumes is attached to one of the virtual disk instances through a data storage interface of that virtual disk instance.

14. The system of claim 13, wherein the program code, when executed by computing resources of the cloud computing platform including at least one central processing unit, further causes the computing resources to create the plurality virtual disk instances further at least in part by causing the computing resources to:
  determine a maximum number of cloud storage volumes that can be attached to individual ones of the virtual disk instances; and
  attach, to each one of the virtual disk instances, the maximum number of cloud storage volumes that can be attached to individual ones of the virtual disk instances.

15. The system of claim 14, wherein the program code, when executed by computing resources of the cloud computing platform including at least one central processing unit, further causes the computing resources to:
  increase a total data storage capacity of the virtual storage appliance at least in part by:
    calculating an amount of increase in the total data storage capacity for the virtual storage appliance,
    calculating a per-cloud storage volume increment by dividing the amount of increase in the total data storage capacity for the virtual storage appliance by a product of a total number of the virtual disk instances and a total number of cloud storage volumes that are attached to each one of the virtual disk instances, and
    increasing a data storage capacity of each one of the cloud storage volumes by the per-cloud storage volume increment.

16. The system of claim 15, wherein the program code, when executed by computing resources of the cloud computing platform including at least one central processing unit, causes the computing resources further causes the computing resources to increase the total data storage capacity of the virtual storage appliance at least in part by causing the computing resources to:
  detect, by each one of the virtual disk instances, the increased data storage capacities of the cloud storage volumes attached to that virtual disk instance;
  expose, by each one of the virtual disk instances to the multiple storage controllers of the virtual storage appliance, a larger logical volume of non-volatile data storage reflecting the increased data storage capacities of the cloud storage volumes attached to that virtual disk instance;
  detect, by the multiple storage controllers of the virtual storage appliance, the larger logical volumes exposed by the virtual disk instances; and
  use, by the multiple storage controllers of the virtual storage appliance, the larger logical volumes exposed by the virtual disk instances to persistently store user data received by the virtual storage appliance from the one or more host devices.

17. The system of claim 13, wherein the program code, when executed by computing resources of the cloud computing platform including at least one central processing unit, further causes the computing resources to:
  increase a total data storage capacity of the virtual storage appliance at least in part by:
    for each one of the virtual disk instances, creating a new cloud storage volume for that virtual disk instance and attaching the new cloud storage volume to that virtual disk instance,
    detecting, by each one of the virtual disk instances, the new cloud storage volume attached to that virtual disk instance,
    exposing, by each one of the virtual disk instances to the multiple storage controllers of the virtual storage appliance, a larger logical volume of non-volatile data storage reflecting a new total number of cloud storage volumes attached to that virtual disk instance,
    detecting, by the multiple storage controllers of the virtual storage appliance, the larger logical volumes exposed by the virtual disk instances, and
    using, by the multiple storage controllers of the virtual storage appliance, the larger logical volumes exposed by the virtual disk instances to persistently store user data received by the virtual storage appliance from the one or more host devices.

18. The system of claim 14, wherein the program code, when executed by computing resources of the cloud computing platform including at least one central processing unit, further causes the computing resources to:
  increase a total data storage capacity of the virtual storage appliance at least in part by:
    creating a plurality of new cloud storage volumes,
    creating a new virtual disk instance,
    attaching the new cloud storage volumes to the new virtual disk instance,
    aggregating, by the new virtual disk instance, non-volatile data storage of the new cloud storage volumes into a new logical volume of non-volatile data storage corresponding to the new virtual disk instance,
    exposing, by the new virtual disk instance, to the multiple storage controllers of the virtual storage appliance, the new logical volume of non-volatile data storage, detecting, by the multiple storage controllers of the virtual storage appliance, the new logical volume, and using, by the multiple storage controllers of the virtual storage appliance, the new logical volume exposed by the new virtual disk instance to persistently store user data received by the virtual storage appliance from the one or more host devices.

19. The system of claim 18, wherein the virtual disk instances have a first instance type, wherein the first instance type has a first IOPS performance limit, and wherein the program code, when executed by computing resources of the cloud computing platform including at least one central processing unit, further causes the computing resources to:

in response to detecting that the first IOPS performance limit is excessively high, for each one of the virtual disk instances:

stop execution of the virtual disk instance, change the instance type of the virtual disk instance from the first instance type to a second instance type, wherein the second instance type has a lower IOPS performance limit than the IOPS performance limit of the first instance type; and restart execution of the virtual disk instance.

20. A computer program product including a non-transitory computer readable medium having instructions stored thereon, wherein the instructions, when executed on processing circuitry, cause the processing circuitry to perform steps including:

creating a plurality of virtual disk instances, wherein each one of the virtual disk instances is a virtual machine, and wherein each one of the virtual disk instances aggregates non-volatile data storage of a plurality of cloud storage volumes that are directly attached only to that virtual disk instance into a single logical volume of non-volatile data storage corresponding to that virtual disk instance;

creating a sub-network that connects the virtual disk instances to a network interface of each one of multiple storage controllers of a virtual storage appliance; and consuming, over the sub-network by each one of the multiple storage controllers in the virtual storage appliance, the logical volumes of non-volatile data storage corresponding to the virtual disk instances to persistently store user data received by the virtual storage appliance from one or more host devices.

* * * * *